United States Patent
Stirzenbecher

[15] 3,697,728
[45] Oct. 10, 1972

[54] HEATING DEVICES

[72] Inventor: George H. Stirzenbecher, Starnberg, Germany

[73] Assignee: Air Plastic Service GmbH, Munich, Germany

[22] Filed: Dec. 4, 1969

[21] Appl. No.: 882,060

[30] Foreign Application Priority Data

Dec. 13, 1968  Germany .........G 68 11 245.8
Dec. 13, 1968  Germany .........G 68 11 246.9

[52] U.S. Cl. ................219/548, 219/213, 219/345, 219/465, 219/528, 219/544, 219/552
[51] Int. Cl. ................................H05b 3/18
[58] Field of Search......219/464, 528, 529, 345, 213, 219/544–545, 386, 543, 465, 552

[56] References Cited

UNITED STATES PATENTS

| 429,560 | 6/1890 | Carpenter.................219/345 |
|---|---|---|
| 1,037,771 | 9/1912 | Hughes....................219/386 |
| 2,458,184 | 1/1949 | Marick..................219/543 X |
| 2,473,183 | 6/1949 | Watson....................219/543 |
| 2,540,295 | 2/1951 | Schreiber................219/213 |
| 2,559,077 | 7/1951 | Johnson et al............219/528 |
| 2,666,839 | 1/1954 | Boetel....................219/528 |
| 3,043,943 | 7/1962 | Moot...................219/465 X |
| 3,385,959 | 5/1968 | Ames et al............219/529 X |
| 3,397,301 | 8/1968 | Hager.....................219/345 |
| 3,453,413 | 7/1969 | Reynolds.............219/213 X |
| 3,465,121 | 9/1969 | Clark....................219/213 |

*Primary Examiner*—Volodymyr Y. Mayewsky
*Attorney*—Kirschstein, Kirschstein, Ottinger & Frank

[57] ABSTRACT

An airplane heating device. The device constitutes a light weight panel which generates heat uniformly over a broad area through the use of a heating foil composed of a flexible substrate coated or impregnated with a resistive material such as carbon particles in a resinous matrix. The foil is, in turn, embedded in a resinous-impregnated electrically nonconductive flexible substrate to form a sheet. The sheet is disposed on a light weight stiff panel of a material such as balsa or rigid foam to form a subassembly that is sandwiched between thin protective covers such as metal or plastic sheets. The heating panel can be used as a wall or floor heating plate in an airplane or as a component of a container-type airplane heating device such as a portable hotplate stove.

1 Claim, 4 Drawing Figures

GLASS SILK

HEATING DEVICES

BACKGROUND OF THE INVENTION

1. Field of the Invention

A light weight areal aircraft heating panel for use for passenger heating or as a component of a portable stove to be carried aboard an airplane.

2. Description of the Prior Art

The present invention deals, generally, with a certain construction of light weight areal heating panel which can be used either as a panel for warming a passenger or as part of a stove that is adapted to be carried aboard an airplane in heated condition from the place where prepared food was initially inserted into the stove. Hence, the prior art about to be discussed will deal separately with previous efforts as to each of these functions.

Presently, electrically heatable passenger warming plates which are customarily used as base plates, i.e., floor plates, as well as for wall plates in a passenger aircraft, are composed of electrical heating elements that are located in the upper zone of the plate. By upper, we refer to the zone which is closer to the interior of the passenger compartment. Heretofore such plates have been composed of electrical resistance wire, the plates being so arranged in an electrical circuit in a fashion such that a temperature of about 23° C. was maintained on the surface of the plate exposed to the interior of the passenger compartment. The heating elements of such electrical resistance wire plates, which are usually energized with an aircraft voltage of typically 28 v. or 115 v. are generally designed in a manner such that with the aid of a thermostatic control a filament wattage of about 150 to 300 watts per square meter is available and, for direct feed, i.e., without a thermostat, a filament wattage of about 20 watts per square meter is provided.

These wire-type plate heaters for aircraft are subject to several disadvantages which have seriously discouraged their use in the past. For example, because the sources of heat actually consisted of wires and the wires could not be uniformly disposed over the entire area of the plate, that is to say, because the wires had to be spaced from one another, the heat generated was not evenly distributed over the entire area of the plate so that there were local temperature differences. These differences were particularly noticeable if a glass fiber covering was used. There was a further disadvantage that electrical resistance wires are prone to break easily because of local physical loads, i.e., localized pressures applied to the plate, because of vibrations of the plate, because of localized differences in wire diameter leading to local high temperatures and burn-outs and because of localized over-heating and burn-out arising from interference with radiation of heat from the plate; that is to say, if a portion of the plate was covered as with a package, the heat under the package and the wires under the package rose to a higher temperature which sometimes led to burning out of the wires. Hence, with a wire-type heating plate in an airplane it has been frequently necessary to replace the plates when they became defective. Repair of the plates is not practical due to the complexity of the construction of the plates.

As to the phase of the invention dealing with portable carry-on-board container-type heating devices, in particular, portable hotplate stoves for foods and drinks for use in passenger aircraft, these consisting of electrically heated containers on and/or within the walls of which there are arranged heating panels, heretofore such containers have been used, in general, for serving of food in passenger aircraft, either liquid food or solid food. Prior to the present invention, this type of heating device, which is really a portable hotplate stove, has had electrical resistance wires arranged in the walls of the container. Foodstuffs which were prepared in advance in the kitchens of the various airlines at the airports or at catering facilities were placed in generally rectangular serving plates which subsequently were inserted in a previously pre-heated hotplate container, or else a heated beverage was placed in a pre-heated hotplate container. In the event the container was adapted to have a beverage dispensed therefrom, the container was usually provided with a spigot. The hotplate container was then transported as a closed pre-heated unit to the kitchen on board the passenger aircraft and was there connected to the power supply for the aircraft, so that the meals to be served to the passengers were kept hot or re-heated until the actual time of service.

Previously employed portable hotplate containers using wires were subject to certain disadvantages which, to some extent, paralleled those of the heating plates heretofore mentioned and which included additional drawbacks. Thus, the electrical wire resistance elements disposed within the walls of the container were subject to the disadvantage of uneven heating. Moreover, this type of hotplate resistance wire containers had a relatively high weight and the use of heat insulation was quite difficult and usually impractical due to the necessity of having a water-tight covering for the resistance heating wires. A thickening of the walls of the container for the reception of appropriate insulation between the outer and inner surface of the walls was not feasible because of the prescribed dimensions of the on-board kitchen of a passenger aircraft, on the one hand, and the size of the standard serving plates used, on the other hand.

A further disadvantage with previous resistance wire type hotplate containers related to the loss of heat between the time that cooked food was placed in a pre-warmed container and the time that the container was connected to the electrical energy on board the aircraft. During the transportation from the airline or catering kitchen to the passenger aircraft, which, typically, took about 30 to 40 minutes, the supply of electrical energy to the container necessarily had to be interrupted. It will be recalled that, due to aircraft space limitations and pre-determined tray sizes, the amount of heat insulation in previous containers has been low or non-existent. Hence, over the period of transport above described, the temperature of the container customarily has dripped from a temperature of about 80° C. at the kitchen to about 55° C. by the time it boarded the aircraft. Quite naturally, this has had a detrimental effect on the quality of the food. Experience has shown that when the temperature drops to the lower range above mentioned, and particularly 5° lower, which often is the case, foods experience a substantial loss of flavor. This, in turn, leads to complaints from the passengers. Hence, if for any reason there is a longer than normal delay in the period between insertion of the hot foods into the pre-heated container to the time that the container is re-plugged to a source of electrical energy in the aircraft, the prepared foods can no longer be served.

SUMMARY OF THE INVENTION

It is an object of the present invention to provide an improved light weight airplane heating panel for use either as a passenger heater or as part of a container which is not subject to any of the foregoing defects.

It is another object of the invention to provide an electricaL passenger heating plate, in particular, a floor plate, for passenger aircraft which embodies a relatively simple construction, a particular uniform heating of the inner surface of the plate (the surface facing the interior of the passenger compartment), a heating plate which has a very low current consumption and a heating plate which is not subject to local damage of its heating element.

It is another object of the invention to provide a carry-on-board aircraft heating container which makes it possible to employ within the unique parameters above described a good heat insulation, this being due to its space-saving features and the light construction of its heating element, thereby resulting in low power consumption and in an ability to maintain heat for extended periods of time when not connected to electrical energy.

It is another object of the invention to provide a heating device of the character described which has an areal heating element which disseminates heat uniformly over its entire effective area, which is rugged in construction, light in weight, simple to manufacture and not subject to local burn-outs.

It is another object of the present invention to provide a heating device of the character described which has an unusually long life and, therefore, is essentially maintenance-free.

In general, the several objects of the present invention are achieved by providing a novel kind of heating panel which utilizes a heating foil composed of a flexible substrate coated or impregnated with a resistive material, e.g., carbon or metal particles, uniformly dispersed throughout a resinous matrix. The foil is embedded, i.e., has both broad surfaces covered by resin impregnated electrically nonconductive flexible substrates which, with the foil, form a heating sheet. The heating sheet is supported on one side and is given body and dimensional stability by a stiff panel of a light weight material such as balsa, a rigid foam or a honeycomb panel, the sheet and stiff panel jointly constituting a subassembly. The subassembly is sandwiched between thin protective covers which may constitute either metal or plastic sheets. All of the elements of the sandwich can be joined together either with mechanical elements or with an adhesive to form the heating panel. Such a heating panel can be used as a wall or floor heating plate for passengers in an airplane or as a wall or floor heating plate for passengers in an airplane or as a wall, base or top of a container heating device for use in an airplane and, specifically, as such a container which is pre-warmed and has cooked warm foods placed therein at a point remote from the airplane, the container then being transported to the airplane while not connected to a source of electrical energy but being connected to such a source upon its arrival at the airplane.

DESCRIPTION OF THE PREFERRED EMBODIMENTS

Figure 1:
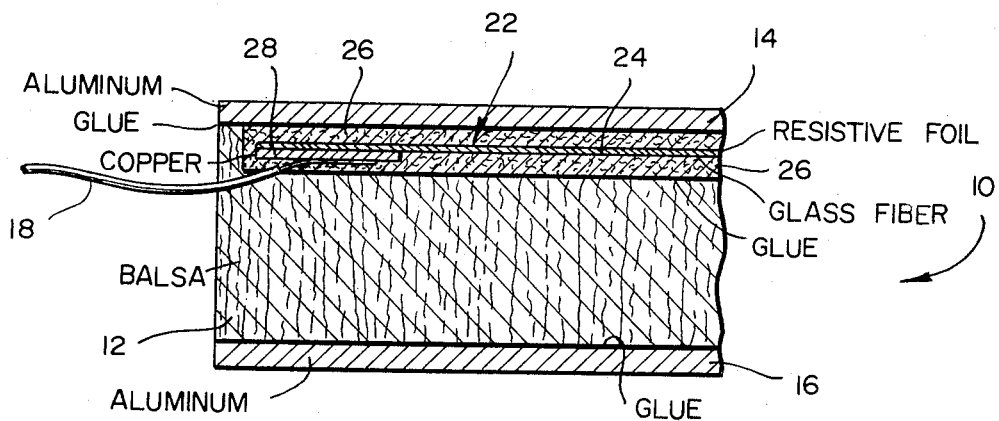
FIG. 1 is an enlarged fragmentary cross-sectional view of a heating device constructed in accordance with and embodying the invention, the same illustrating the device as embodied in an airplane passenger heating panel, one edge of the figure illustrating an edge of the panel.

As indicated previously, the essence of the present invention resides in the unique construction of the heating device which renders it peculiarly useful for utilization on board an aircraft where the ambient conditions and parameters create special requirements for any heating element. Thus, the heating device must be light weight; it must not be bulky; the heating element must be well thermally insulated from ambient temperatures and yet must be poorly thermally insulated from the surface or space which is to be heated. The device must generated heat with great uniformity; it must be essentially maintenance-free and, therefore, not subject to burnout; it should not have, under any circumstances, any local hot spots; it should be able to withstand shocks, blows and vibrations; it should function even in the event of splitting or rupture of small or large parts thereof; and yet it must be reliable and inexpensive to make.

The foregoing desiderata are, generally, accomplished by a combination of several components into a unitary heating device that can be employed either as a passenger heating panel or as a carry-on-board hotplate type of container. The heating component assumes the form of:

a. a flexible foil including an electrically nonconductive substrate. A typical good material for this purpose is a glass fiber fabric such, for instance, as glass cloth. Alternate acceptable substrates are synthetic fabrics, either woven, knitted or felted; a pellicle or sheet such, for instance, as a sheet of a synthetic plastic, e.g., a sheet of Mylar (terephthalate ester), polyvinyl chloride, polyethylene chloride or polybutadiene; or a woven, knitted or felted cloth of natural material such as animal (e.g., wool), mineral (e.g., asbestos) or vegetable e.g., cotton or linen) fiber.

The foil further constitutes:

b. a resistance heating layer carried by the substrate. The layer may be pre-formed and adhered to the substrated, although this form is not the most desirable; or it may be pre-formed and secured to the substrate under heat and pressure in the event that the layer includes a thermoplastic matrix, although this form, likewise, is not the most desireable. Preferably, the layer is in the form of a solid which is converted from a liquid, having been applied to the substrate in liquid form and allowed to solidify. The liquid can be applied in any wellknown manner such, for instance, as brushing, spraying, coating, e.g., with a doctor blade or from a fountain or from a reservoir formed between a pair of nip rolls between which the substrate passes, or the layer can be impregnated into the substrate utilizing any of the foregoing techniques, or immersion, i.e., passing of the layer through a bath containing the to-be-solid in liquid form. The liquid form which is converted to solid may experience conversion in any of the manners well known to workers in the plastic art such, for instance, as having the eventual solid dissolved or dispersed in a volatile liquid which, when volatilized, after application leaves the solid, or the liquid may be in the form of monomers or still-liquid polymers which are converted to solid form by polymerization as with heat or the aid of catalysts.

The resistance heating layer includes, in addition to the solid which acts as a matrix:

c. a mass of electrically resistive particles uniformly dispersed throughout the layer. Such particles can constitute powdered metals, e.g., iron powder, or powdered forms of carbon such as graphite, soot and carbon black. Preferably, the foil, as thus constituted, has a positive temperature coefficient of resistance; that is to say, increases in its resistivity with a rise in temperature. A resistance heating layer thus composed is disclosed in British Pat. No. 1,053,331.

The foil consisting of the substrate with the electrically resistive layer now is embedded in:

d. a flexible, thin electrically nonconductive insulating sheet which covers both broad surfaces of the foil and acts to electrically isolate the resistance heating foil from its physical surroundings as well as to aid in waterproofing the same. The aforesaid sheet is thin enough not to materially interfere with thermal conduction, i.e., although it may have an appreciable coefficient of thermal nonconductivity it is so thin that the temperature drop across the sheet on both sides of the foil is quite low, negligible insofar as the functional utility of the heating device is concerned. A typical sheet is any one of the materials mentioned for the foil substrate, such material preferably being impregnated with a resin so as to render the same impermeable to liquids and thus maintain the integrity of electrical insulation of the foil. Any temperature resistant resin can be utilized for impregnating the substrated of the sheet. These can be the same resins as those used for the matrix of the resistive heating layer. By way of example, such resins include polystyrene, organopolysiloxanes, polyethyleneterephthalate, polyethylene, polybutylene, polypropylene and rubber (either natural or synthetic).

As thus far composed, the composite element, including the foil embedded in the electrically nonconductive sheet, is flexible, making it lack utility as a structural element, for instance, as a structural member of a container or a panel. Therefore, to render the foil rigid and thereby enable it to be self-supporting and a component of an aircraft assembly or of a container, the combined foil and sheet are supported on one side, this being the exterior side, to wit, the side remote from the space to be heated, with:

e. a stiff core. The core, in addition to imparting rigidity to the foil/sheet, acts as a thermal blanket, so to speak, on the side on the foil/sheet which the core covers. There is an appreciable temperature gradient across the core which has a good heat-insulting characteristic. A typical material for the core is a rigid foam such as a polystyrene foam; or a honeycomb, e.g., a honeycomb of resin-impregnated glass fibers; or balsa, e.g., endgrain balsa. The foil/sheet is secured to the core in any suitable fashion, a typical mode of securement being through the use of adhesive, e.g., flue.

The composite assembly as thus far described, to wit, the foil/sheet/core, is still vulnerable to physical harm and to guard against this the foil/sheet/core is sandwiched between:

f. thin protective covers. Desirably, these covers, likewise, are liquid impervious and, to as great an extent as possible, are imperforate and of undisturbed integrity, i.e., have none or as few as possible openings therein, as for fastening purposes. The covers, desirably, are thin, rugged and tough so that they will not add noticeably to the bulk of the finished heating device, and yet will protect the internal construction. Moreover, the covers, because of their thinness have a negligible temperature gradient. Typical materials useful as the covers are aluminum, stainless steel and synthetic plastic sheets. The covers may be held in place to the foil/sheet/core as with the aid of glue or adhesives, or with mechanical expedients such as screws, rivets or nuts and bolts.

Suitable means is included to apply electric potential to spaced edges of the foil. Typically, for this purpose there is employed:

g. strips of a good electrical metal conductor such as copper, aluminum or silver, in the form of a narrow foil or sheet, to wit, a band, the same being a flat conductor. The bands are clamped to the edges of the foil either mechanically or with the use of a conductive adhesive. Suitable electric leads are attached to the discrete bands.

It will be apparent that the heating device, as thus generally described, is simple to make, rugged in construction, essentially impervious to the physical strains and shocks present in an aircraft in flight, is impermeable to liquids such as water and will give a uniform dissemination of heat. Moreover, because the resistive foil is areal in nature rather than wire-like, it will continue to function for the purpose of generating heat even if some portion of the foil is pierced, split or otherwise ruptured, so long as there remain paths of conduction between the discrete bands (terminals).

Furthermore, a heating device such as described does not tend to overheat and burn out if a limited area thereof has the heat condition therefrom hindered. This is particularly true where the resistive layer has a positive thermal coefficient of resistance such as mentioned previously.

It also will be appreciated that the heating device is highly efficient as a heater in that it is well insulated against temperature conditions external to the surface or space to be heated, and the heating device is particularly useful in connection with aircraft because it creates a good source of mild heat with very low weight and with comparatively small bulk. This feature is of special importance in connection with containers to be carried aboard an aircraft because it keeps the interior of the pre-heated container and the just-cooked and still-warm foods at a temperature above that at which its palatability will be impaired during the transit from a kitchen to the aircraft where the container is again connected to a source of electrical energy from which it was disconnected during the aforesaid transit.

Figure 2:
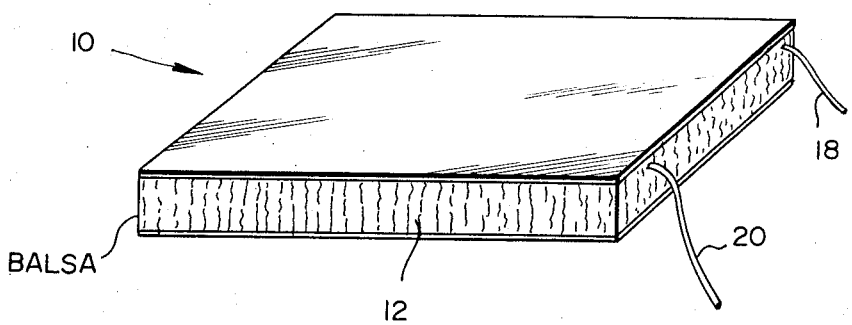
FIG. 2 is an isometric view of an entire heating panel using the structure of FIG. 1.

Referring now specifically to the drawings, and more particularly to FIGS. 1 and 2, the reference numeral 10 denotes an electrical heating panel of the light weight variety adapted to be installed in an airplane and specially designed to be used as a floor plate for passenger aircraft. In line with the previous discussion, the panel 10 includes a core 12 which may be of honeycomb glass fiber reinforced with a thermally resistant resin, or a rigid thermally resistant foam, e.g., polystyrene foam, preferably a foam of the closed-cell type, or, as illustrated, balsa wood, specifically an endgrain balsa wood (the direction of the grain is indicated in FIGS. 1 and 2). Covers 14,16 of thin sheet material, e.g., aluminum, stainless steel, fiberglass or heat-resistant thermoset plastics in the form of sheets, constitute the exterior components of the panel 10. Out of the core 12 at suitable places on the sides or bottom, electrical conductors 18, 20 are provided which are connected to the power supply of a passenger aircraft, preferably with a thermostat control in series therewith.

FIG. 1 shows the inside of the heating panel in greater detail. As can be seen in this figure, an areal heating element 22 is provided, the term "aerial" denoting a broad surface area and, specifically, in this case, of sheet-like configuration. This heating element 22 is disposed beneath the upper cover 14. The heating element includes the foil/sheet component heretofore described. In particular, the heating element 22 is formed of a flexible foil 24 embedded in a flexible thin electrically conductive insulative sheet 26. In the illustrated form of the invention the foil 24 constitutes a flexible electrically nonconductive substrate made of glass fiber cloth. This cloth is coated with a resistance heating layer. The heating layer may be of the type shown in British Pat. Nos. 1,027,051 or 1,053,331. Other suitable heating layers are disclosed in U.S. Pat. Nos. 2,314,766; 2,803,566 and 3,399,451. In general, the heating layer is a preferably resinous thermally resistant matrix throughout which there are dispersed embedded particles of resistive material. An excellent material for the matrix is an organopolysiloxane such as any one of the said organopolysiloxanes mentioned in British Pat. No. 1,027,051. The resistive heating material, desirably, is carbon black. Several examples of such resistive material are given in the last-named British patent. Other examples of a resistive layer are given in British Pat. No. 1,053,331. This particular type of resistive layer is specially advantageous because it has a positive temperature coefficient of resistance so that if any portion of the panel has its heat dissipation obstructed such portion will not tend to be overheated to the point of burn-out. In the foil 24 shown the resistive layer is applied by dipping the substrate in the resistive material while the same still is in liquid form, whereby to obtain impregnation of the layer into the substrate, although, as previously pointed out, the resistive layer may be applied in any suitable fashion, such as coating, spraying or brushing, to only one side of the substrate.

The embedding electrically nonconductive sheet 26 in the example mentioned is glass cloth, i.e., glass fiber, reinforced by an epoxy laminate, although an epoxy embedded within the fibers of the cloth is also suitable. It will be recalled that an epoxy is only one of several materials that can be used for the preferable purpose of rendering the embedding sheet 26 liquid impervious and for insulating it from its surroundings, in particular, the upper cover sheet 14 which may be electrically conductive.

Band-shaped flat-type conductors 28, for example, strips of sheet copper foil, are attached to two opposite edges of the foil 24, preferably by being mechanically clamped thereon, e.g., by having the bands folded around opposite edges of the rectangular foil, or as shown by having the bands adhere to opposite edges of the foil as with an adhesive of low thermal resistance. The aforesaid flat conductors 28 are connected to the electrical conductors 18, 20 shown in FIG. 1.

The resistive foil, which is the heat-generating component of the heating panel and which is equipped with the flat conductors 28, is, as previously pointed out, embedded in the sheet 26 which is disposed on both sides thereof and which is rendered liquid impermeable by impregnation with a thermally resistant solid which, in addition to achieving a waterproof effect, provides electrical insulation and concurrently serves to increase the mechanical stability of the otherwise relatively delicate resistive foil 24.

The upper cover sheet 14 is secured as by adhesive to the upper surface of the sheet 26 in which the resistive foil is embedded, and the lower surface of the sheet 26 is secured as by adhesive to the upper surface of the core 12. Because the heating element 22 had a finite thickness, and in order to protect the peripheral edges of the heating element, the upper surface of the core 12 is recessed to accommodate the heating element and leave upstanding peripheral flanges that protect the edges of the element, the peripheral zones of the undersurface of the upper cover being secured as with adhesive to the upper surface of the peripheral flange.

Because the heating element 22 consisting of the foil 24 and sheet 26, as well as the band conductors 28, are relatively thin and can be easily constructed, the heating element 22, according to the invention, can be quite thin in the order, for instance of 1½ mm. It is, therefore, possible to have the foil very close to the undersurface of the upper cover plate 16, which cover plate presents very little interference with flow of heat therethrough. Thus, only a small portion of the heat generated is deflected down through the core 12 which has a substantial temperature gradient. This results in a very low current consumption.

Furthermore, since heat generation takes place across the entire surface of the floor plate, with the negligible exception of the peripheral flanges, there is no local temperature variation. Due to the areal nature of the resistive foil 24, there is formed within the heating element 22 an essentially infinite number of current paths so that it is of little significance if minor damage occurs at various places of the foil 24 due to local loads or vibration or penetration. Hence, the life expectancy of the heating panel 10 is exceptionally long, so long that, in essence, it is essentially maintenance free.

Although the heating panel has been described with particular reference to use in aircraft where it has its far greatest advantage, it is conceivable that such heating panel can be used for other purposes as, for instance, to effect space heating in apartments or offices, in which case the plates may form all or part of a floor or wall of ceiling.

The aforesaid heating panel 10, furthermore, can be used as a part of a heating container. This is the embodiment of the invention as illustrated in FIGS. 3 and 4.

Figure 4:
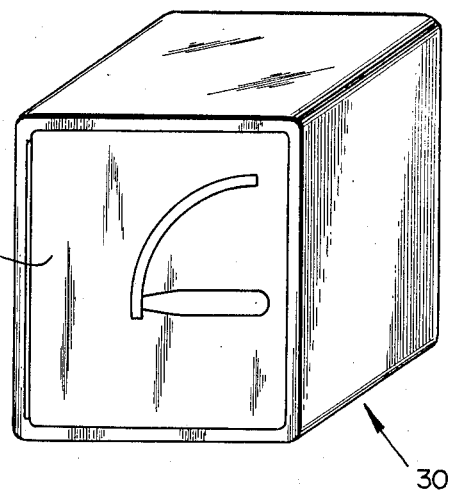
FIG. 4 is an isometric view of such container.

As can be seen in FIG. 4, the reference numeral 30 denotes a container which has a top wall, side walls, a back wall and a bottom wall, as well as an open front. The open front is provided with a hinged door 32. The container is of horizontal rectangular cross-section and is provided with the usual oppositely aligned, horizontal, inwardly extending flanges for the purpose of receiving standardized size rectangular serving dishes such as are conventionally used for passenger aircraft. The container 30 is of the electrically energizable type, i.e., it contains an electrically energizable heating element or elements which will soon be mentioned. The energization of these heating elements is effected by the utilization of standard control devices including such components as signal lights, switches, thermostats, and the like; as signal which are not shown because they do not form a part of the instant invention. The structure of at least one wall, and this may, although it does not, desirably, include the door 32, is identical, in general, i.e., with the exceptions hereinafter pointed out, to the construction of the heating panel 10.

Figure 3:
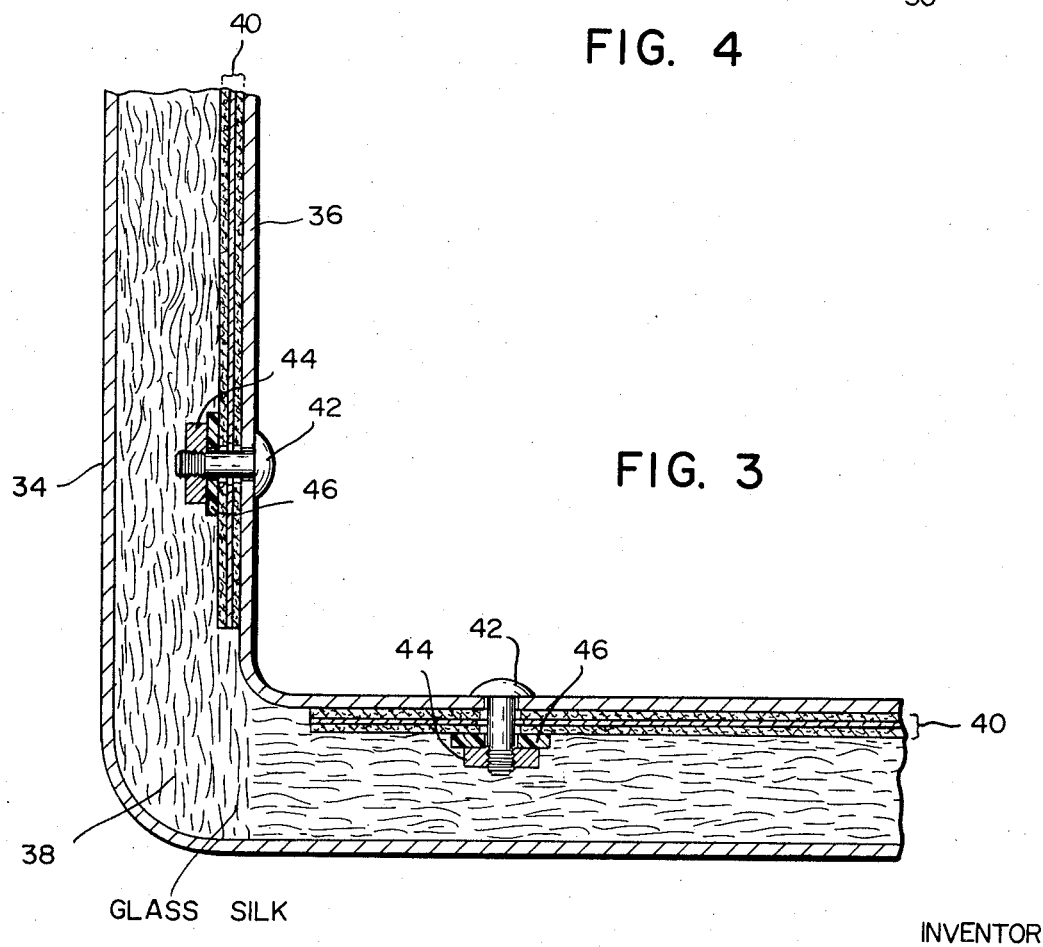
FIG. 3 is a fragmentary cross-sectional view similar to FIG. 1 but illustrating the device as incorporated in a container for use, after pre-heating, in carrying heated food from a place of preparation to the container while the container is not electrically energized, although capable of being so energized both at the place of preparation and the airplane.

As can be seen in FIG. 3, the container has an outer cover 34 on any one or more of the walls, and an inner cover 36 on the inside of the container. The two covers are spaced apart a pre-determined distance sufficient to accommodate a thermal insulating core 38, which is the same as the core 12, and a heating element 40, which is the same as the heating element 22. Hence, the core and the heating element will not be described in any further detail. The electrical connections to the resistive foil of the heating element is effected in the same manner as was described with respect to the heating panel 10 and, therefore, will not be re-described herein.

On the inner cover 36 openings are provided spaced a suitable distance from one another through which are inserted screws 42. These screws engage nuts 44 embedded in the core and held thereto as with a heat-resistant adhesive. The nuts are spaced from the heads of the screws by washers 46. The washers are disposed below, i.e., on the outermost side of, the heating element 40 so that tightening on the screws 42 serves to fasten the heating element 40 to the inner cover 36 of the container 30.

Attention is directed to the fact that where the shanks of the screws pass through the heating element 40 the heating element is formed with over-sized apertures to prevent contact between the metal of the screw and the resistive layer of the heating element whereby to avoid interference with or grounding of a part of the resistive layer and also to prevent the inner cover from becoming electrically live. Moreover, the over-sized apertures prevent heating of the screws which are made of metal, and thereby inhibit the formation of local hot spots at the heads of the screws. Optionally, additionally, each washer 46 may include an annular flange around the opening therethrough, which flange extends through the over-sized opening in the heating element. The washers are, in this instance, made of electrically nonconductive material, e.g., Teflon.

It will be observed that, with the aforesaid construction, a highly efficient heating container is provided which, although encouraging transmission of heat from the heating element to the interior of the container, maximizes the transmission of heat to the interior of the container so that, due to such arrangement, a maximum space for insulation is provided between the inner and outer covers. The core 38 is, as previously noted, rigid so as to impart dimensional stability to the container 30. Suitable materials are balsa wood, foamed rigid polystyrene and reinforced glass fiber honeycomb. However, due to the fact that the inner cover and outer cover, if made of metal, are inherently self-reinforcing so that the same degree of rigidity is not necessary for the core, it is within the ambit of the present invention to utilize somewhat less rigid materials for the core such, for instance, as glass silk, glass wool, rock wool, damped aluminum foil, asbestos, or the like.

In a specific embodiment of the hot plate container 30, according to the present invention, it is possible for a standard-size container, such as conventionally is employed with prescribed dimensions in a passenger aircraft, to obtain a saving in weight in the order of 3½ lbs., this being due solely to the method of construction as heretofore set forth. This, in view of the fact that in aircraft loading every possible pound of dead weight should be minimized, is quite a considerable achievement. Moreover, because a very good insulating layer is arranged between the cover and the heating element during the non-energized period of transportation of the hotplate-type container from an airport or catering kitchen to a passenger aircraft, it has been found that, employing the invention, the temperature within the container (with the door closed) only drops from 80° C. to about only 65° C. so that upon reconnecting the container to a source of electrical energy aboard the passenger aircraft the correct temperature will be reached in a relatively short period of time, typically about one-half hour. Still further, due to the construction above described embodying the present invention, even with an 80° C. inside temperature the temperature of the outer cover 34 only reaches a value of about 30° C. which is far lower than the temperature reached by electrically-energized hotplate ovens presently in use. Thereby the container 30 embodying the present invention can be handled more easily by ground crews and stewardesses.

Although the container 30 has been described as one with an open front closed by a swinging door, it will be readily understood and appreciated that the container may have a closed front, a spigot near its bottom and a cappable mouth at its top, so that it can be used for heating liquids to be carried aboard an aircraft, typical liquids being hot water, coffee, etc.

It may be observed that a typical heating element constructed in accordance with the invention is of unusually light weight in the order of 0.3 lbs. per square foot, its thickness is about one-sixteenth of an inch, and its resistance typically ranges from 30 to 300 ohms per square meter. The operating temperature of the heating element may range up to 480° F. The thickness of the covers 14 and 16, when of aluminum, is typically 30 s.w.g. manufactured according to British standard 2L.72. The thickness of the core and covers of the heating panel can be varied to meet any requirement; by way of example, the core 12 may be of three-eighths inch thickness. An alternate thickness of the upper cover 14 is 26 s.w.g. and of the bottom cover 16 is 30 s.w.g., L.72 aluminum, likewise, being utilized. The peripheral edges of the heating panel may be sealed with an epoxy resin or a filled polyester resin.

A typical average weight for a finished heating panel is about three-fourths lb. per square foot where the core is foamed polyvinyl chloride or rigid polystyrene, and about one lb. per square foot where the core is of endgrain balsa. The power consumption for the panel ranges from about 15 to about 30 watts per square foot and will maintain an average temperature at the top cover 14 of about 65° F. using a thermostatic control. Optionally, the panel may consume about 2 watts per square foot to maintain the same average temperature, in which case no thermostatic controls are required.

It may be observed that a polyvinyl chloride rigid foamed core for the heating panel has a coefficient of thermal conductivity of about 0.25 B.t.u./hr. per square foot per degree Fahrenheit in comparison to endgrain balsa where the coefficient is about 0.80 B.t.u. per hr. per degree Fahrenheit. Of course, endgrain balsa cored panels have better structural characteristics than a foamed polyvinyl chloride cored panel, to wit, better indentation resistance and better resistance to static bending and distributed load.

Insofar as the container is concerned, its walls, constructed as aforesaid, have essentially the same electrical, physical and heat-insulative characteristics as those set forth for the heating panel.

It thus will be seen that there are provided devices which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

Having thus described the invention there is claimed as new, and desired to be secured by Letters Patent:

1. An airplane heating device to be located aboard an airplane in flight, said device including
   a. a light weight rigid, self-supporting panel which generates heat uniformly over a board area,
   b. said panel being composed of
      i. a flexible heating areal foil embedded in
      ii. an electrically nonconductive insulating sheet which covers both broad surfaces of the foil and acts to electrically isolate the foil from its physical surroundings;
   c. said flexible heating foil having a positive resistive coefficient,
   d. said sheet being water impermeable to waterproof the foil and being thin so that the temperature drop across the sheet during operation of the device is negligible,
   e. a light weight stiff thermally resistant core of a good thermal insulating characteristic on which the embedded foil is disposed,
   f. means to secure the embedded foil to a broad surface of the core which is the exterior surface of the core, and
   g. thin, rugged, tough, water impervious protective covers to complete the panel, said covers having a negligible temperature gradient during operation of the device,
   h. one said cover covering the surface of the embedded foil remote from the core and the other cover covering the surface of the core remote from the first cover,
   i. means to secure the covers to the embedded foil and to the core, said foil constituting a flexible electrically nonconductive substrate having a resistance heating layer carried thereby,
   j. said resistance layer having a solid electrically nonconductive matrix through which there is uniformly dispersed a mass of electrically resistive particles
   k. said electrically nonconductive insulating sheet constituting a flexible electrically nonconductive substrate embedded with a temperature resistant resin, and
   l. conductive terminals connected to spaced points along edges of the foil and electrical leads connected to said terminal.

* * * * *